United States Patent
Krivenok

(10) Patent No.: US 12,468,591 B2
(45) Date of Patent: Nov. 11, 2025

(54) FAST CORE DUMP GENERATION FOR MEMORY INTENSIVE APPLICATIONS IN PUBLIC CLOUDS

(71) Applicant: Dell Products L.P., Round Rock, TX (US)

(72) Inventor: Dmitry Vladimirovich Krivenok, Dublin (IE)

(73) Assignee: Dell Products L.P., Round Rock, TX (US)

( * ) Notice: Subject to any disclaimer, the term of this patent is extended or adjusted under 35 U.S.C. 154(b) by 64 days.

(21) Appl. No.: 18/630,278

(22) Filed: Apr. 9, 2024

(65) Prior Publication Data

US 2025/0315333 A1    Oct. 9, 2025

(51) Int. Cl.
*G06F 11/00* (2006.01)
*G06F 9/50* (2006.01)
*G06F 11/07* (2006.01)

(52) U.S. Cl.
CPC ........ *G06F 11/0778* (2013.01); *G06F 9/5077* (2013.01); *G06F 11/0787* (2013.01)

(58) Field of Classification Search
None
See application file for complete search history.

(56) References Cited

U.S. PATENT DOCUMENTS

| | | | |
|---|---|---|---|
| 7,685,575 B1 * | 3/2010 | Fareed | G06F 11/0781 717/130 |
| 9,158,540 B1 | 10/2015 | Tzelnic et al. | |
| 9,286,261 B1 | 3/2016 | Tzelnic et al. | |
| 10,831,591 B2 | 11/2020 | Upadhyay | |
| 11,269,734 B2 | 3/2022 | Ramohalli Gopala Rao et al. | |
| 2009/0172409 A1 * | 7/2009 | Bullis | G06F 21/554 714/38.11 |
| 2023/0367624 A1 | 11/2023 | Kumar et al. | |
| 2024/0289252 A1 * | 8/2024 | Day | G06F 11/3698 |

OTHER PUBLICATIONS

Google Scholar/Patents search—text refined (Year: 2025).*

* cited by examiner

*Primary Examiner* — Christopher S McCarthy
(74) *Attorney, Agent, or Firm* — BainwoodHuang

(57) ABSTRACT

A method for core dump for a terminated (e.g., "crashed") application includes instantiating helper processes and performing a multi-threaded streaming of chunks of memory contents to respective helper processes. A set of backend storage resources of respective types is established to receive the core dump. Each helper process performs the following for the respective stream: (1) instantiating a set of writer threads for writing data to the respective different types of backend storage resources, (2) buffering the stream in a sequence-preserving manner, and (3) by each of the writer threads, independently reading buffered chunks and writing them to a respective backend storage resource with preservation of chunk identity to enable later reconstruction of complete memory contents. The time required to generate a core dump for a large memory-intensive application can be shortened, reducing application restart time and promoting application availability.

20 Claims, 5 Drawing Sheets

FAST CORE DUMP GENERATION FOR MEMORY INTENSIVE APPLICATIONS IN PUBLIC CLOUDS

BACKGROUND

The present invention relates to the field of data processing, and in particular to processes for generating "core dumps" (readouts of complete memory contents) as used for analysis and diagnosis of application program "crashes", i.e., irregular termination.

SUMMARY

A method is disclosed of performing a core dump for a terminated (e.g., "crashed") application, which includes instantiating helper processes and performing a multi-threaded streaming of chunks of memory contents for the terminated application to the helper processes, wherein each helper process receives a respective stream of chunks from a respective streaming thread. A set of backend storage resources of respective types is established to receive the core dump. Each of the helper processes performs the following for the respective received stream of chunks: (1) instantiating a set of writer threads for writing data to the respective different types of the backend storage resources, (2) buffering the received stream of chunks in a sequence-preserving manner, and (3) by each of the writer threads, independently reading buffered chunks and writing them to a respective one of the backend storage resources with preservation of chunk identity to enable later reconstruction of complete memory contents for the terminated application. By the disclosed technique, the time required to generate a core dump for a large memory-intensive application can be shortened considerably, reducing application restart time and promoting availability accordingly.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Figure 1:
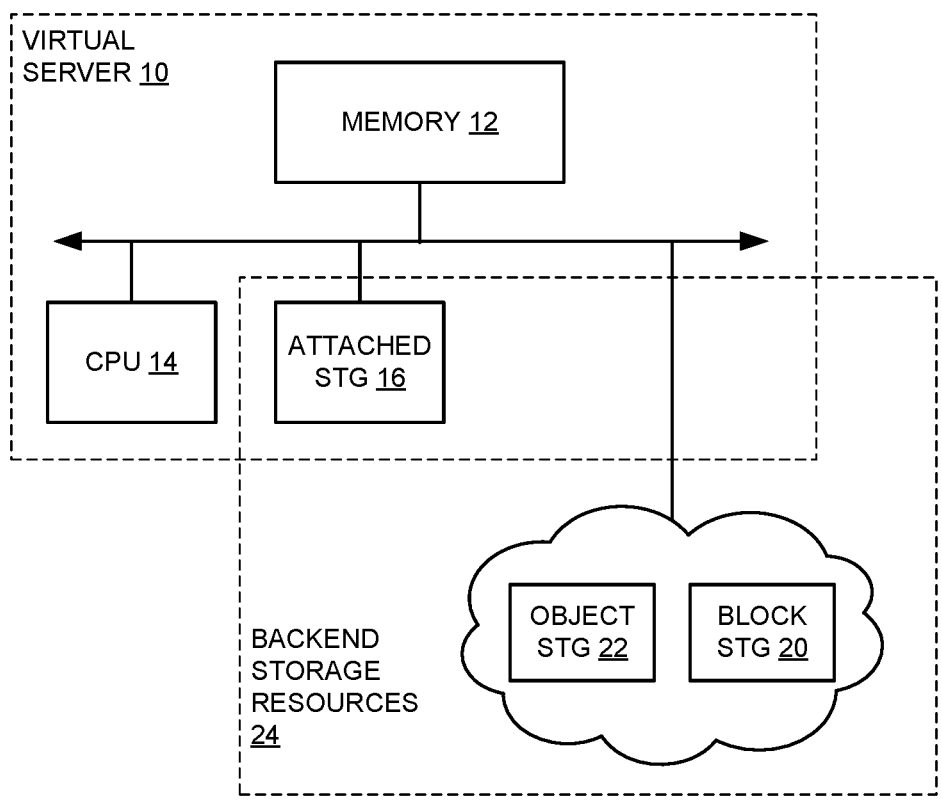
FIG. 1 is a block diagram of a virtual server instance with connection to separate object and block storage resources.

Disclosed is a novel approach to speeding up core dump generation for memory intensive applications in public clouds. It is based on leveraging heterogeneous backend technologies (e.g., cloud volumes, directly attached SSDs, object buckets, and others) in a dynamic and cost-effective way to achieve high throughput as well as supporting parallel core dump of large process to avoid bottlenecks of existing single-threaded designs. The approach may achieve speedup of the order of 10× or more over conventional single-threaded core dump to instance-owned storage.

Problem Statement

Many memory-intensive applications are executed in public clouds, and instances with very high memory requirements (e.g., 100s of GB) are known. Examples include large in-memory databases, data paths of large storage systems, and others. In some cases, a single multi-threaded process allocates and uses much of the memory available to the cloud instance, as provided by a virtual server for example.

When software errors manifest, such as by causing an executing process to "crash" (abnormally terminate), it can be important to collect memory contents for later analysis. Such collection of memory contents is generally referred to as a "core dump", a term that harkens to the early use of "core" memory in computers. One problem is that core dump generation for very large processes may take a lot of time. This is especially problematic in public cloud environments where cloud instance storage subsystem performance is limited and costly.

The problem can be demonstrated with an example, which is described in the context of Amazon Web Services™ (AWS™) cloud infrastructure having Elastic Computer Cloud (EC2) instance types with memory sizes larger than 100 GB. Normally, core dumps are saved to a local filesystem on so-called Elastic Block Storage (EBS) volume(s). However, each EC2 instance has a hard-coded limit for maximum throughput to all attached EBS volumes. In an example, the time required to dump 100% of instance memory to EBS volumes considering instance throughput limit may be on the order of 200-300 seconds (i.e., several minutes). This time may be higher under certain circumstances. Additionally, there is a problem in that EBS volumes use a provisioned model where provisioned I/O operations per second (IOPS, a measure of performance) must be paid for regardless of whether those are needed or not. This model is clearly suboptimal from the cost perspective for the purposes of gathering core dumps of crashing processes (which are generally rare, but nonetheless disruptive, in practice).

There are several reasons why the above issues can be important in real operating systems:
- Large memory intensive processes cannot be restarted until core dump process finishes (an obvious reason is because there is usually just not enough memory to hold the second instance of the process while previous one is dumping core, but there are other reasons for that as well).
- If a system does not support high availability via some form of active/active or active/passive clustering, then core dump time will significantly extend system downtime.
- Even if a system is clustered and supports high availability, a single failure may still lead to degraded performance for the time of failure because other nodes may need to populate memory from cold storage or perform costly rebalancing operations.
- Depending on the nature of the software error, identical processes running on multiple nodes may experience the same error at about the same time, meaning that the whole cluster may experience extended downtime while nodes are performing core dumps.

Approach to Address Problem

When an error happens in a process, the system kernel may be configured to generate a core dump for further post-mortem analysis of the failure. It may do so by writing the core dump to a pre-defined location in the process filesystem, or in some cases piping the memory contents to a user-space process that generates the core dump in some tailored fashion. Either way, there are generally two types of bottlenecks regarding the core dump process:

- Producer bottleneck—the kernel itself needs to go over memory pages of the process and write them to a consumer (e.g., filesystem or a pipe to user-space process). Single threaded implementation of this process will be bound by one CPU core and may become a bottleneck if the consumer could handle a faster data flow.

Consumer bottleneck—limited throughput of the storage device where the core dump is being written.

To address this problem, in one aspect a disclosed approach provides for multi-threaded generation of core dumps, using a plurality of user-space "helper" processes and associated mechanisms. For each helper, a known data piping mechanism may be used for sending a respective stream of memory contents to the helper. Metadata passed to the user-space helper may include parameters such as the total number of threads (streams) and a current thread (stream) identifier. Memory content is preferably divided into chunks which are sent to different user-space helpers in some known fashion (e.g., round-robin). Each user-space helper knows the corresponding producer thread index K in the range [0, N–1] (where N is number of streams) which can be added to output file name (or other core dump metadata) to enable later coherent reassembly of the full core dump. Note that, while it is important to minimize core dump generation time as described above, it is generally much less critical to optimize reassembling time because it is typically an offline process. The above approach provides for higher core-dump throughput on the producer side by leveraging multiple threads simultaneously.

In a second aspect, the disclosed approach provides for speeding up core dump generation by eliminating/reducing bottlenecks on the consumer side in a cost-effective way. For this, a heterogeneous and dynamic approach is used, which is based on the fact that each cloud instance may have multiple different backend storage types subject to different performance limits. It is also based on the fact that resources in the cloud may be provisioned dynamically to avoid infrastructure costs associated with the provisioned performance cost model.

As an example, in the AWS environment a typical EC2 instance may have multiple attachment slots (exact number is instance type specific) where different types of backend storage devices/services may be attached:

EBS volumes—each volume has throughput limit and instance itself has well-defined aggregate throughput limit for EBS.

Instance Storage (IS) volumes—these are directly attached disks. Unlike EBS volumes, their throughput may not be well-defined in an instance specification and can vary from one instance type to another. Cost of those drives is included in the cost of instance itself. One big downside of those volumes is that they are not persistent, and content does not survive instance stop/start or instance level failure events. Nonetheless, these may be acceptable for core dumps.

ENI network interfaces—those are vNICs and a single vNIC is usually enough to reach max network throughput of the instance (multi-NIC instances need more vNICs to reach limits). ENI itself is not relevant for core dump process, but it allows the instance to access wide range of services available in the cloud, for example object storage (S3) buckets.

Importantly, the throughput limits of such a heterogeneous set of storage resources are independent. The core-dump handling process is organized to leverage multiple heterogeneous backend types to write out the core dump content in multiple parallel output streams, increasing overall throughput and reducing core dump duration accordingly. Another important aspect is to avoid pre-provisioning of storage resources and associated cost. Thus, at least some provisioning of cloud resources is preferably done only for the time of core dump handling.

EMBODIMENTS

FIG. 1 is a block diagram description of a cloud computing environment. It includes a collection of hardware resources organized as a virtual server 10. These resources include memory 12, processing (CPU) 14, and attached storage secondary (STG) 16. As generally known, virtual servers are realized on underlying physical computing infrastructure, sometimes described as "host" machines. Thus, the virtual server 10 corresponds to a particular set of hardware structures of such a host machine, as allocated and used with a corresponding machine operating system and associated functionality and provided by a cloud service provider.

As shown, the virtual server 10 also has network connections to other cloud-provided storage resources including block-type storage (BLOCK STG) 20 as well as object-type storage (OBJECT STG) 22. Along with the attached storage 16, these form an example set of backend storage resources 24. In the AWS environment, the block-type storage 20 may be realized using EBS volumes, and the object-type storage 22 using S3 buckets. Generally, other cloud computing environments provide similar or analogous types of storage resources.

Figure 2:
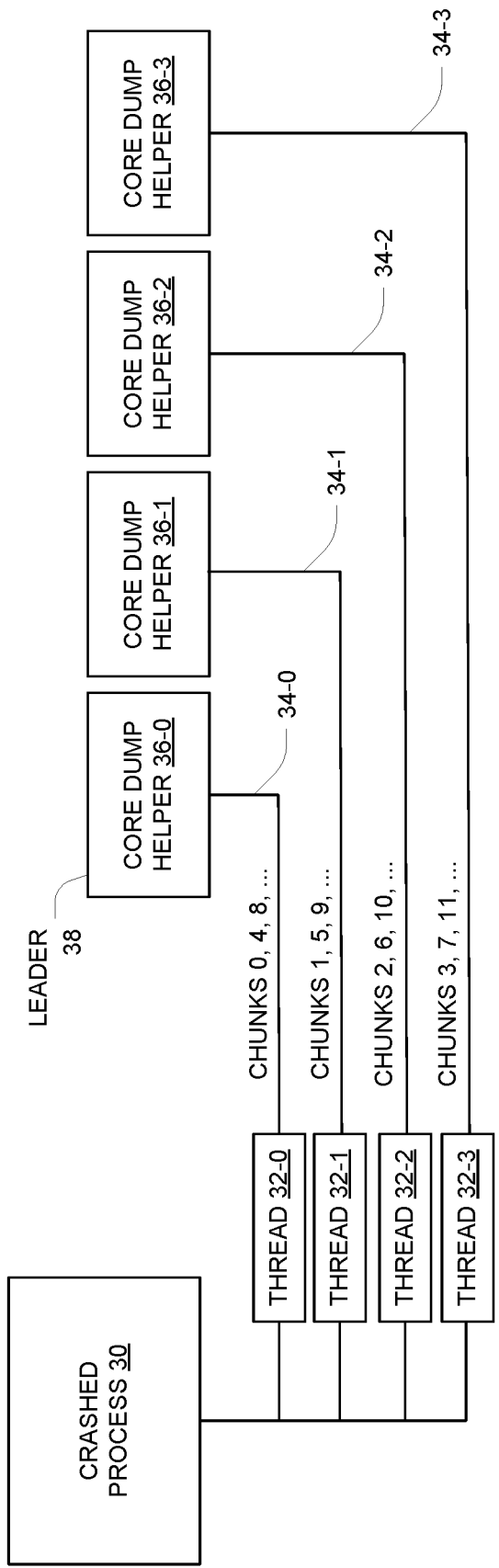
FIG. 2 is a schematic diagram of multi-threaded memory readout to a set of helper processes.

FIG. 2 is a schematic depiction of producer-side organization for generating a core dump for a crashed process 30. It includes a set of independent reader threads 32 (four in this example, identified as 32-0 through 32-3) generating respective chunk streams 34 (34-0 through 34-3), received by corresponding core dump helpers 36 (36-0 through 36-3). One helper 36 (e.g., 36-0) functions as a leader 38, while all the helpers 36 (including leader 38) function as workers, as described more below. In this example, the memory contents are read out in an interleaved or "striped" manner, i.e., each stream 34-$i$ ($i$=0, 1, 2, 3) contains chunks 4S+i, for S=0, 1, 2, . . . Other schemes may of course be used. All helper processes 36 process memory content piped from the respective threads 32, while the leader 38 is also responsible for additional intelligence of the process as explained below.

Figure 3:
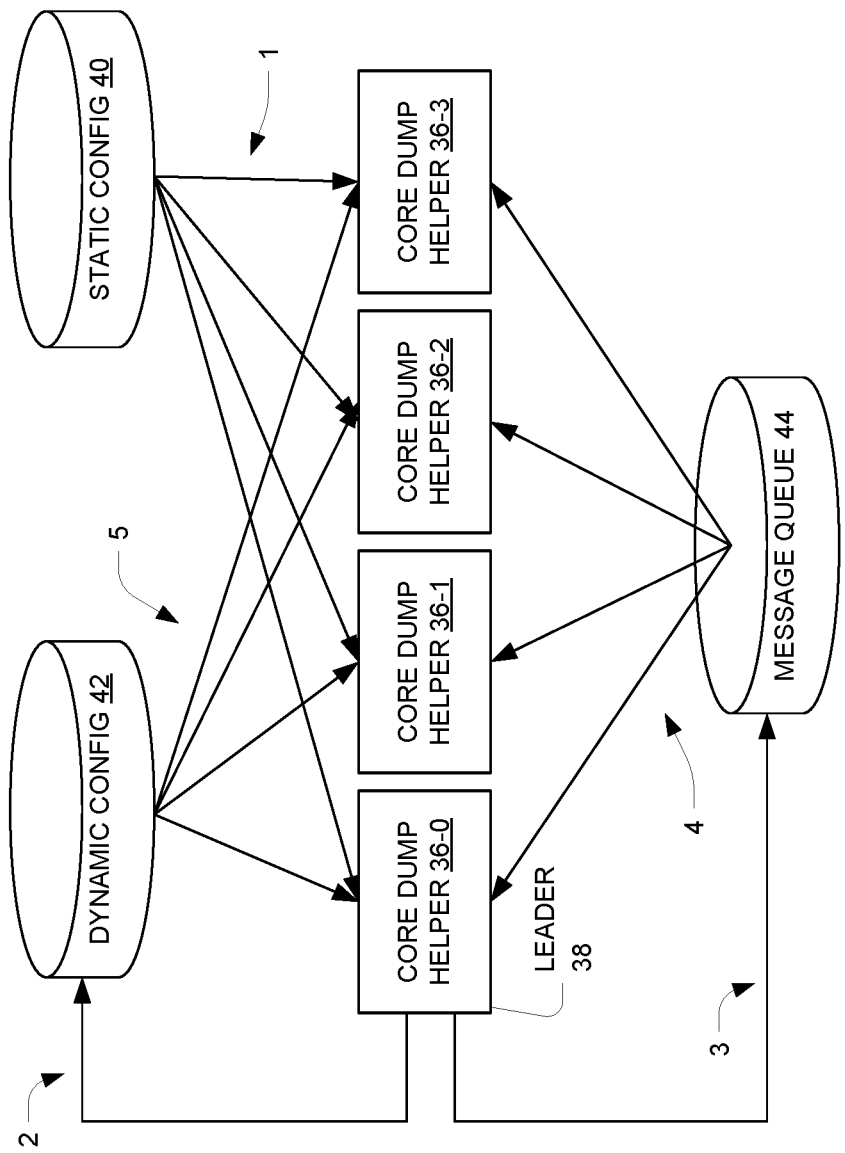
FIG. 3 is a schematic diagram showing the creation and communication of backend storage configuration information.

FIG. 3 illustrates the use of two types of configuration data that dictate the manner in which the helpers 36 store their respective streams. These include static configuration data 40 and dynamic configuration data 42. The static configuration data 40 is pre-established and includes a list of backend resources 24 with corresponding configuration which are always available for the core dump process. For example, for a block-storage backend 20 the configuration may be a list of directories that can be used for core dumps. The dynamic configuration data 42 is generated by the leader 38 on the fly upon commencement of the core dump generation process, as described more below. As shown, processing includes use of a message queue 44 by which the leader 38 signals to the worker helpers 36 regarding the availability of the dynamic configuration data 42. Also shown in FIG. 3 are indications and brief descriptions of five operations (1-5) involved in signaling and consumption of configuration data. Operation 1 is the reading of pre-established static configuration 40 by all helpers 36, which can be performed by each helper 36 upon initialization. The remaining operations (2-5) are orchestrated by the leader 38, as described more below.

Initially, the leader process 38 spawns a separate control plane thread that first assesses the availability and need for any dynamic provisioning. The leader 38 knows information about the crashed process 30 such as its process ID (PID) and name, and may obtain information about its memory size (resident set size or RSS). The leader 38 first assesses whether dynamic provisioning is possible at all. For example, if all available attachment slots are already used, then no additional volumes may be attached to the virtual server instance 10. Assuming some dynamic provisioning is possible, the leader 38 estimates the need for additional backend resources 24, by determining how long it will take for the core dump to complete using only static configuration and comparing this estimate with estimated time to dynamically provision additional resources. If the core dump is likely to complete before new resources are provisioned and ready to use, the leader 38 does not bother provisioning additional resources. Otherwise, if attachment slots are available and provisioning time is small compared to the expected duration of the core dump using only static resources, then the leader 38 provisions additional backend resources 24 dynamically and saves information about those resources as the dynamic configuration data 42 (step 2 in FIG. 3), primarily for use by the worker helpers 36 to set up dynamic storage resources. This information also can be used at a later time to enable a cleanup process to de-allocate the dynamically allocated resources and enable their use for other purposes.

The approach utilizes a modular or "pluggable" backend architecture relying on availability of different types of storage, as briefly noted above in reference to FIG. 1. At least three types of backend storage may be implemented in modern clouds today. For example, in AWS those types are EBS (example of block storage 20), Instance Storage (example of attached storage 16), and S3 (example of object storage 22). Other clouds such as Azure® and Google Cloud Platform™ (GCP™) have similar technologies. Implementation details of the approach will generally be cloud-specific. These three backend types are used as a non-limiting example to illustrate the approach; other types and mixes of backends may be utilized (for example, remote memory pools).

The following table illustrates how backend configuration may be specified. Attached storage 16 and object storage 22 are typically part of static configuration and can be selectively enabled by an end user. Block storage 20 may generally be part of both static and dynamic configuration.

| Backend Type | Configuration | Specification example (AWS) |
| --- | --- | --- |
| Block Storage | Static or dynamic | EBS: <dir1>, <dir2>, . . . , <dirN> |
| Attached Storage | Static | IS: <dir1>, <dir2>, . . . , <dirM> |
| Object Storage | Static | S3: <bucket1>, <keyprefix1>, . . . , <bucketK>, <keyprefixK> |

The control path thread of the leader 38 communicates with block storage 20 via a control plane (see dotted line in FIG. 4) and performs operations such as volume creation and attachment. In the example of AWS, those communications are part of EBS public API, with authentication being fully transparent through IAM integration with instance profiles and IMDSv2. The control path thread knows the instance type and its full throughput limit as well as provisioned throughput of all block-storage volumes used in the static configuration. The difference between them is the maximum throughput usable for the core dump. The table below demonstrates example logic assuming the provisioning of general-purpose block-storage (BS) volumes (e.g., gp3 volumes in AWS) which are limited to 1000 MB/s per volume.

| Static configuration | Throughput limit | Max dynamic configuration |
| --- | --- | --- |
| 1 BS volume @750 MB/s | 1000 MB/s | 1 BS volume @250 MB/s |
| 2 BS volumes @500 MB/s | 2000 MB/s | 1 BS volume @1000 MB/s |
| 2 BS volumes @500 MB/s | 2500 MB/s | 2 BS volumes @750 MB/s |

As an additional cost optimization measure, the control path thread may leverage the fact that each BS volume may have some amount (e.g., 125 MB/s) of throughput for free, so if there are many free attachment slots, it may provision a large number (e.g., 10-12) of BS volumes at this lower rate (e.g., 125 MB/s) rather than a smaller number of high-rate volumes (e.g., the BS volumes @750 MB/s in the example above). This substantially eliminates the performance cost of dynamically provisioned volumes (capacity cost is not avoidable).

Once dynamic provisioning is done and volumes are attached to the virtual server instance 10, the control path thread creates filesystems on the volumes, mounts them to predefined mount points, generates and stores the dynamic configuration data 42 (step 2 of FIG. 3), then signals the worker helpers 36 to process the dynamic configuration 42 (steps 3-5 of FIG. 3). For the signaling, any suitable communications mechanism may be used, such as shared memory, sockets, or message queues 44 as in the example of FIG. 3. The use of the dynamic configuration data 42 by the worker helpers 36 is described further below.

Figure 4:
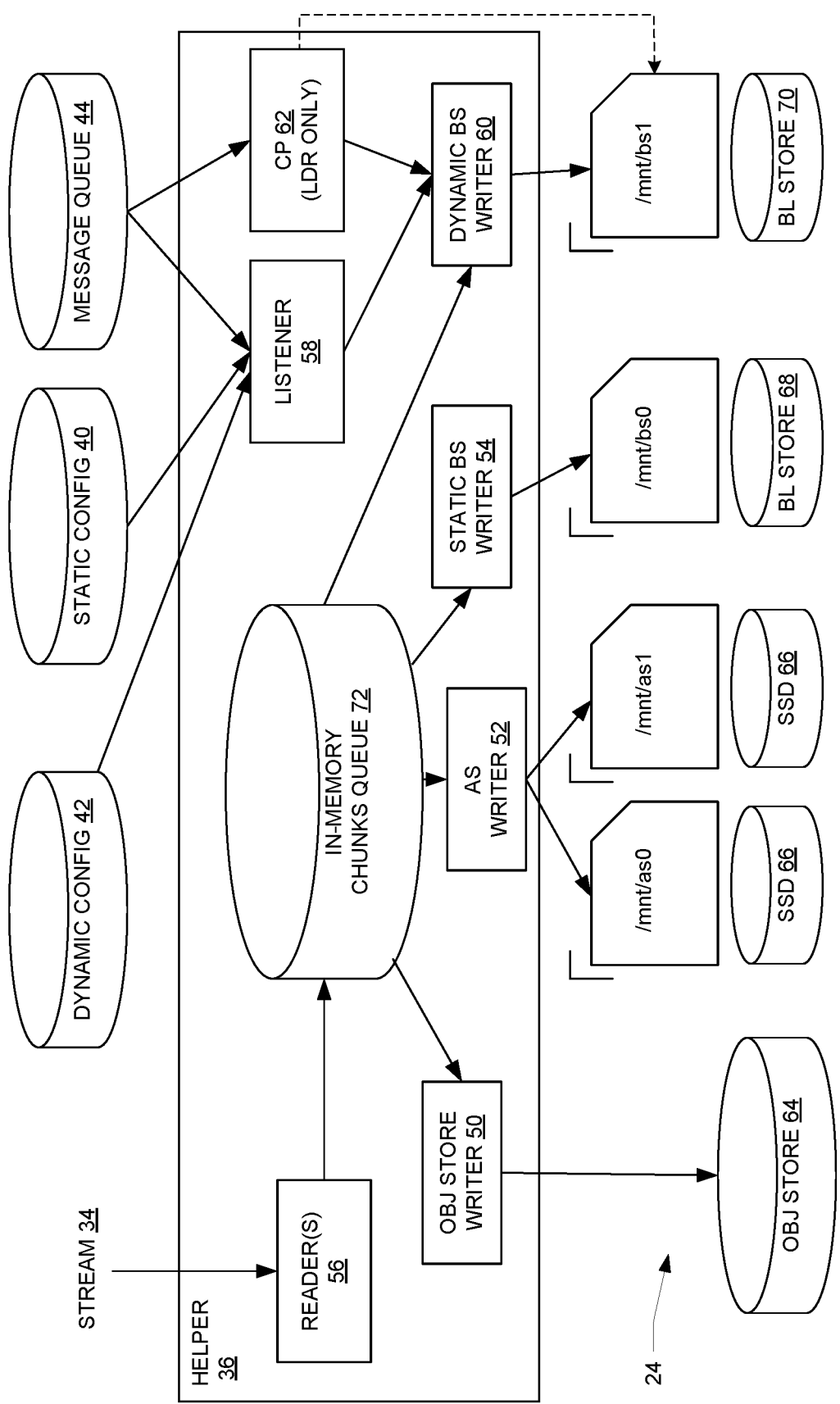
FIG. 4 is block diagram of a helper process with associated configuration stores and backend storage resources written by respective writer threads.

FIG. 4 shows structure of an individual helper 36 and associated components including the configuration data 40, 42, the message queue 44, and an example set of backend storage resources 24. Each helper 36 first reads the static configuration 40 and creates multiple threads or coroutines to handle writes to different backends, which are shown as respective writers 50, 52 and 54 (described more below). The helper 36 also spawns one or more threads/coroutines shown as reader(s) 56 to read the respective stream 34 being piped from the kernel. In addition, a dedicated listener thread 58 is created, whose role is to wait for dynamic configuration change signaling from the leader 38 and spawn more threads/coroutines to handle writes to dynamic backends, shown as dynamic block-storage writer(s) 60. Also shown in FIG. 4 is the control plane (CP) component 62, which is active on only the leader 38.

FIG. 4 also illustrates use of a variety of backend storage types including an object store 64, attached SSDs 66, static block store 68, and a dynamic block store 70, which are written to by their respective writers 50-54 and 60. Also shown are example mount points /mnt/* for the block-oriented stores 66-70.

As mentioned above, the core dump of the crashed process 30 is preferably split into chunks at the producer side to avoid single-thread bottlenecks and help with parallelizing the process. The user-space helper processes 36 generally write data to multiple backends, and for each backend there are generally multiple locations (different directories on BS volumes of block stores 68-70, different object buckets of object store 64, etc.). So, on the consumer side the memory content is further split between the backends. Chunk sizes do not have to be the same, but for description purposes herein it is assumed that they are. Using different chunk sizes affects the mechanics of the reassembly process, whose details are not elaborated herein.

Each helper process 36 knows its index K from range [0, N−1] (N is number of streams), and reads only the corresponding chunks. Once read, each chunk is assigned a monotonically increasing sequence number (used to help with later reassembly) and then written to an in-memory chunks queue 72. For any given chunk C, it is not predictable which backend or location (e.g., directory) it will be written to. The writer threads 50-54 and 60 pull available chunks from the queue 72 and write them out to their respective backend stores 64-70. Normally, faster backend writes process more chunks than slower writers, with write speed being dependent on instance type and configuration.

Each writer may write to a single file (or object) per location or may write each chunk to a separate file (or object) depending on chunk size, filesystem in use, or other implementation specific details. If multiple chunks are written to a single file, they are preferably prepended by a header which contains the sequence number. If there is only one chunk per file/object, then the sequence number may be included in the file/object name.

Each writer performs backend-specific write operations. For example, AS writer 52 and BS writers 54, 60 perform writes to files. The object store writer 50 performs object operations, such as PutObject or analogous operations as determined by API.

The core dump is complete when all user-space core dump helper processes 36 have written all the respective chunks to backend storage. The leader 38 may save metadata about the core dump which, besides standard attributes (PID, name, timestamp, UID, etc.), includes both the static configuration data 40 and dynamic configuration data 42 used for processing of the core dump. This metadata may be saved separately in a known location so as to be available for the later processes of reconstruction and analysis.

Figure 5:
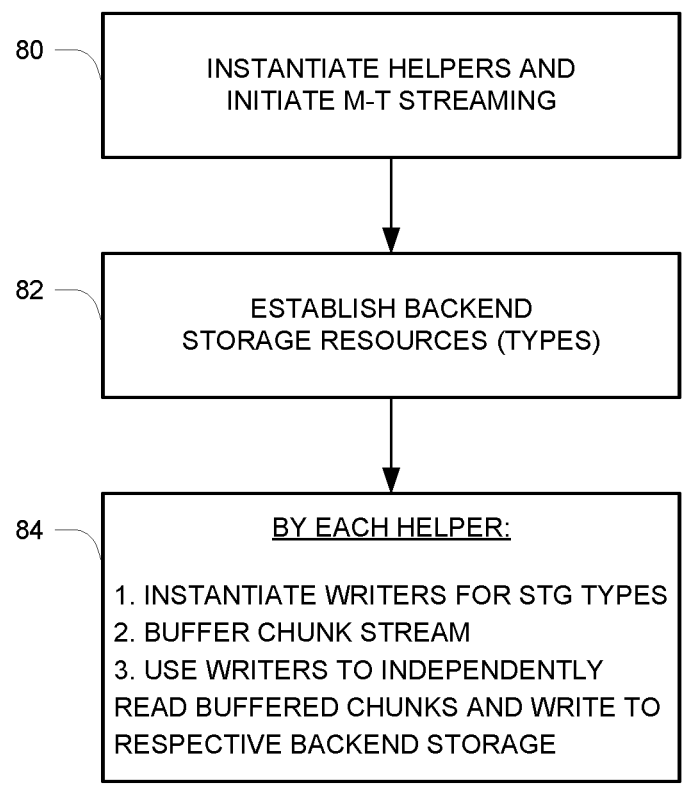
FIG. 5 is a high-level flow diagram of a core dump generation process.

FIG. 5 presents a generalized flow diagram of key operations involved in performing a core dump for a terminated application (e.g., crashed process 30).

At 80, a plurality of helper processes (e.g., 36) are instantiated, and multi-threaded streaming of chunks of memory contents for the terminated application to the helper processes is initiated. Each helper process receives a respective stream of chunks (e.g., 34) from a respective streaming thread (e.g., 32).

At 82, a set of backend storage resources of respective types (e.g., 64-70) are established for receiving the data of the core dump. As described, there may be a mix of statically configured resources and dynamically configured resources.

At 84, each of the helper processes performs operations for the respective received stream of chunks, including (1) instantiating a set of writer threads (e.g., 50-54 and 60) for writing data to the respective different types of the backend storage resources, (2) buffering the received stream of chunks in a sequence-preserving manner (e.g., using queue 72 and sequence numbers as described above), and (3) by each of the writer threads, independently reading buffered chunks and writing them to the respective backend storage resource(s) with preservation of chunk identity to enable later reconstruction of complete memory contents for the terminated application (e.g., as described in detail above with reference to FIG. 4).

Later analysis or other use of the core dump first requires reassembling of the original streams of chunks. Each stream is processed starting from sequence number 0. A reassembly process looks at every location specified in static and dynamic configuration it finds in the core dump metadata. Below is a pseudo-code description which demonstrates a reassembly process with O(1) complexity. The code may be optimized to speed up reassembly process by prefetching chunks in parallel from different backends.

```
done = false
while(!done) {
    done = true;
    for (chunkStream:=0; chunkStream<N; chunkStream++) {
        if(chunkSeq[chunkStream] >= maxSeq[chunkStream]) continue;
        chunk = readChunkFromBackend(chunkStream, chunkSeq
            [chunkStream]);
        appendToCommonCoreDumpFile(chunk);
        chunkSeq[chunkStream]++;
        done = false;
    }
}
```

The table below demonstrates how this approach may speed up core dump of 100 GB process between 14× and 28× compared to a baseline process (1 BS volume, 825 seconds), which is used in many modern systems running in public cloud. "Discard" describes a case of simply reading all chunks and discarding them without storing, which can be viewed as an upper bound on speedup.

| Backend | Core dump duration (seconds) | Notes |
| --- | --- | --- |
| 1 BS vol. | 825 | 125 MB/s provisioned IOPs |
| 1 BS vol. | 105 | 1000 MB/s provisioned IOPs |
| N BS vols. | 8.5 | N = 13, e.g., |
| MAS vols. | 21 | M = 4, e.g .; 4 SSDs per instance |
| Object buckets | 7 | One bucket with VPCE configured (ENA: 50 GE vs 200 GE) |
| Multiple types | 4 | BS + AS + Obj in parallel |
| Discard | 2 | Read chunks and discard without storing |

The following can be general advantages of the technique described herein:

Reduction of both producer side and consumer side bottlenecks in the process of core dump of a single large process, significantly reducing overall time required.

Avoiding need for upfront provisioning of cloud resources such as additional or more powerful cloud volumes. This significantly reduces the cost of infrastructure intended to hold core dumps of large memory intensive applications (those events may be very rare in practice).

Leveraging heterogeneous backend technologies available to cloud instances, such as directly connected SSDs, reliable cloud volumes and services such as object storage accessible via cloud networking. This enables achievement of higher total throughput.

Support for both user configurable static configuration as well as dynamic configuration of cloud resources and intelligent logic which determines whether it is beneficial to provision extra cloud resources to speed up the core dump.

Use of pluggable backend architecture that enables extension to other types of backends which may become available in public clouds in the future (such as remote memory pools and others).

While various embodiments of the invention have been particularly shown and described, it will be understood by those skilled in the art that various changes in form and details may be made therein without departing from the scope of the invention as defined by the appended claims.

What is claimed is:

1. A method of performing a core dump for a terminated application, comprising:
    instantiating a plurality of helper processes and performing a multi-threaded streaming of chunks of memory contents for the terminated application to the helper processes, each helper process receiving a respective stream of chunks from a respective streaming thread;
    establishing a set of backend storage resources of respective distinct types to receive the core dump; and
    by each of the helper processes for the respective received stream of chunks, (1) instantiating a set of writer threads for writing data to the respective different types of the backend storage resources, (2) buffering the received stream of chunks in a sequence-preserving manner, and (3) by each of the writer threads, independently reading buffered chunks and writing them to a respective one of the backend storage resources with preservation of chunk identity to enable later reconstruction of complete memory contents for the terminated application.

2. The method of claim 1, wherein for the multi-threaded streaming, a plurality of reader threads are operative to read corresponding parts of the memory contents in an interleaved manner.

3. The method of claim 1, wherein one of the helper processes further operates as a leader to orchestrate operation of the helper processes, including (1) performing a dynamic part of the establishing of the set of backend storage resources, and (2) signaling an availability of dynamically-established backend storage resources to the helper processes for their use in storing respective parts of the core dump.

4. The method of claim 3, further including, by the leader upon completion of the core dump by the helper processes, saving metadata about the core dump including (1) identification and timestamp information, and (2) configuration data identifying specific locations on the backend storage resources where respective parts of the core dump are saved, the metadata being used for subsequent processing of the core dump.

5. The method of claim 1, wherein establishing the set of backend storage resources includes using two types of configuration data that dictate a manner in which the helper processes store their respective streams, the two types including static configuration data and dynamic configuration data, the static configuration data being pre-established and including a list of first backend resources with corresponding configuration which are always available for the core dump process, the dynamic configuration data being generated dynamically upon commencement of the core dump generation process and identifying second backend storage resources with corresponding configuration that have been dynamically made available for use by the core dump process.

6. The method of claim 5, wherein one of the helper processes further operates as a leader to orchestrate operation of the helper processes, including (1) dynamically establishing the second backend storage resources and generating the dynamic configuration data therefor, and (2) signaling an availability of the dynamic configuration data to the helper processes to enable them to use the second backend storage resources in storing their respective parts of the core dump.

7. The method of claim 6, wherein the leader is further operative to initially assess a need for dynamic provisioning as a condition to performing steps (1) and (2), the assessment including determining that a time required for the dynamic provisioning is small compared to an expected duration of the core dump using only the static first backend storage resources.

8. The method of claim 7, wherein the leader is further operative to also assess possibility of dynamic provisioning based on determining availability of attachment slots of a virtual server instance for additional backend storage resources.

9. The method of claim 1, wherein the distinct types of the backend storage resources include at least a direct-attached type and separate service-accessed types, the direct-attached type being included in a virtual server instance hosting the terminated application and executing the core dump process, the service-accessed types being separate cloud-provided storage resources accessed by the virtual server instance using cloud network infrastructure.

10. The method of claim 9, wherein the service-accessed types include a block type and an object type, the block type presenting storage resources as extents of fixed-size blocks, the object type presenting storage resources as uniquely identified, variable-size storage objects.

11. A virtual server instance in a cloud computing environment, configured and operative to perform a core dump for a terminated application hosted by the virtual server instance, by:
    instantiating a plurality of helper processes and performing a multi-threaded streaming of chunks of memory contents for the terminated application to the helper processes, each helper process receiving a respective stream of chunks from a respective streaming thread;
    establishing a set of backend storage resources of respective distinct types to receive the core dump; and
    by each of the helper processes for the respective received stream of chunks, (1) instantiating a set of writer threads for writing data to the respective different types of the backend storage resources, (2) buffering the received stream of chunks in a sequence-preserving manner, and (3) by each of the writer threads, independently reading buffered chunks and writing them to a respective one of the backend storage resources with preservation of chunk identity to enable later reconstruction of complete memory contents for the terminated application.

12. The virtual server instance of claim 11, wherein for the multi-threaded streaming, a plurality of reader threads are operative to read corresponding parts of the memory contents in an interleaved manner.

13. The virtual server instance of claim 11, wherein one of the helper processes further operates as a leader to orchestrate operation of the helper processes, including (1) performing a dynamic part of the establishing of the set of backend storage resources, and (2) signaling an availability of dynamically-established backend storage resources to the helper processes for their use in storing respective parts of the core dump.

14. The virtual server instance of claim 13, wherein the leader is further configured and operative, upon completion of the core dump by the helper processes, to save metadata about the core dump including (1) identification and timestamp information, and (2) configuration data identifying specific locations on the backend storage resources where respective parts of the core dump are saved, the metadata being used for subsequent processing of the core dump.

15. The virtual server instance of claim 11, wherein establishing the set of backend storage resources includes using two types of configuration data that dictate a manner in which the helper processes store their respective streams, the two types including static configuration data and dynamic configuration data, the static configuration data being pre-established and including a list of first backend resources with corresponding configuration which are always available for the core dump process, the dynamic configuration data being generated dynamically upon commencement of the core dump generation process and identifying second backend storage resources with corresponding configuration that have been dynamically made available for use by the core dump process.

16. The virtual server instance of claim 15, wherein one of the helper processes further operates as a leader to orchestrate operation of the helper processes, including (1) dynamically establishing the second backend storage resources and generating the dynamic configuration data therefor, and (2) signaling an availability of the dynamic configuration data to the helper processes to enable them to use the second backend storage resources in storing their respective parts of the core dump.

17. The virtual server instance of claim 16, wherein the leader is further operative to initially assess a need for dynamic provisioning as a condition to performing steps (1) and (2), the assessment including determining that a time required for the dynamic provisioning is small compared to an expected duration of the core dump using only the static first backend storage resources.

18. The virtual server instance of claim 17, wherein the leader is further operative to also assess possibility of dynamic provisioning based on determining availability of attachment slots of a virtual server instance for additional backend storage resources.

19. The virtual server instance of claim 11, wherein the distinct types of the backend storage resources include at least a direct-attached type and separate service-accessed types, the direct-attached type being included as part of the virtual server, the service-accessed types being separate cloud-provided storage resources accessed by the virtual server using cloud network infrastructure.

20. The virtual server instance of claim 19, wherein the service-accessed types include a block type and an object type, the block type presenting storage resources as extents of fixed-size blocks, the object type presenting storage resources as uniquely identified, variable-size storage objects.

* * * * *